United States Patent
Han et al.

(10) Patent No.: US 10,255,952 B1
(45) Date of Patent: Apr. 9, 2019

(54) PUSH-PUSH APPARATUS FOR INSTALLING AND REMOVING HARD DISK

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: He-Tao Han, Wuhan (CN); Jun-Hua Tan, Wuhan (CN); Xiao-Zhong Jing, Wuhan (CN); Yi-Sheng Lin, New Taipei (TW); Liang-Chin Wang, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/990,918

(22) Filed: May 29, 2018

(30) Foreign Application Priority Data

Dec. 28, 2017 (CN) .......................... 2017 1 1464122

(51) Int. Cl.
*G06F 1/18* (2006.01)
*G11B 33/00* (2006.01)

(52) U.S. Cl.
CPC ............ *G11B 33/005* (2013.01); *G06F 1/187* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,261,574 B2* | 8/2007 | DeLuga | ................ | E05C 19/022 439/152 |
| 7,407,395 B2* | 8/2008 | Deluga | ................. | E05C 19/022 439/152 |
| 8,837,136 B2* | 9/2014 | Hu | ........................ | G11B 33/124 248/220.21 |
| 9,647,359 B2* | 5/2017 | Cho | ..................... | H04B 1/3816 |
| 10,015,892 B1* | 7/2018 | Chien | .................. | G11B 33/124 |
| 10,080,300 B1* | 9/2018 | Olesiewicz | .......... | H05K 5/0004 |
| 2007/0037422 A1* | 2/2007 | Miyamoto | ............. | G06K 13/08 439/157 |
| 2007/0037425 A1* | 2/2007 | Miyamoto | ............. | G06K 13/08 439/159 |
| 2012/0305720 A1* | 12/2012 | Chen | ....................... | G06F 1/187 248/220.22 |
| 2013/0147332 A1* | 6/2013 | Hu | ....................... | G11B 33/027 312/319.2 |

(Continued)

*Primary Examiner* — Lisa Lea-Edmonds
(74) *Attorney, Agent, or Firm* — ScienBiziP, P.C.

(57) ABSTRACT

A small-volume push-push apparatus for mounting and demounting a hard disk includes a pressing member, a bracket, and an elastic rod. The bracket defines first to fourth sliding slots, and the elastic rod includes a sliding portion. The pressing member can drive the sliding portion to slide along the first to fourth sliding slots in sequence. When the sliding portion slides to an ending point of the first sliding slot and intersects with the second sliding slot, the bracket can move at a first direction. When the sliding portion slides to a starting point of the first sliding slot away from the fourth sliding slot, the bracket can move in a second direction opposite to the first direction.

20 Claims, 6 Drawing Sheets

(56) References Cited

U.S. PATENT DOCUMENTS

2014/0377976 A1* 12/2014 Tsai .................... G06K 7/0069
439/345
2017/0351304 A1* 12/2017 Mundt .................... G06F 1/187

* cited by examiner

PUSH-PUSH APPARATUS FOR INSTALLING AND REMOVING HARD DISK

FIELD

The subject matter herein generally relates to hard disk installations.

BACKGROUND

Computers include push-push apparatus for putting in and taking out hard disk. The heart-shaped cams of the push-push apparatus occupy a large space.

BRIEF DESCRIPTION OF THE DRAWINGS

Implementations of the present technology will now be described, by way of example only, with reference to the attached figures.

DETAILED DESCRIPTION

Figure 1:
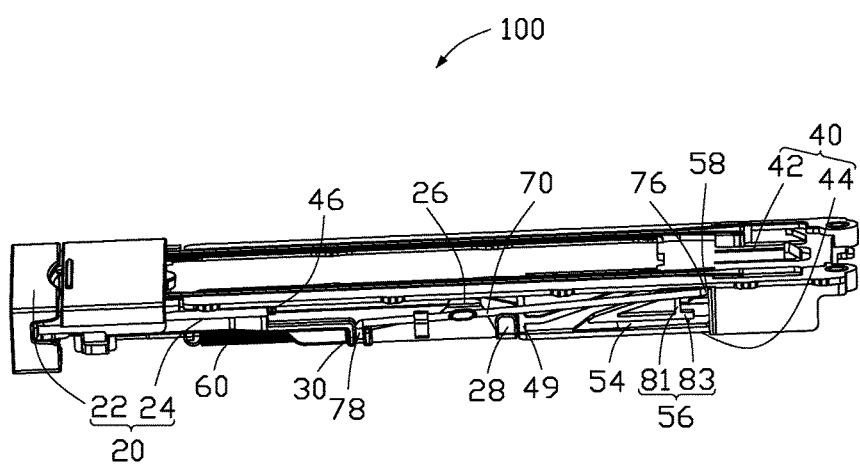
FIG. 1 is an isometric view of a push-push apparatus with an elastic rod sliding to an end of a first sliding slot.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as restricting the scope of the embodiments described herein. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" means "including, but not necessarily limited to"; it specifically indicates open-ended inclusion or membership in a so-described combination, group, series, and the like.

Figure 2:
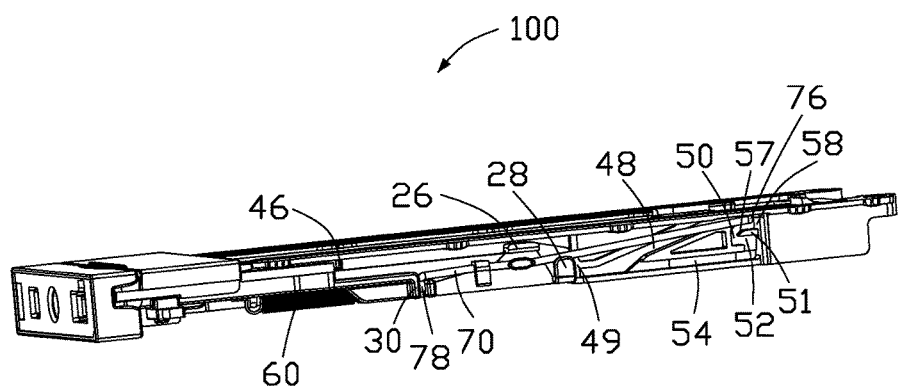
FIG. 2 is similar to FIG. 1, but viewed from another angle.
Figure 3:
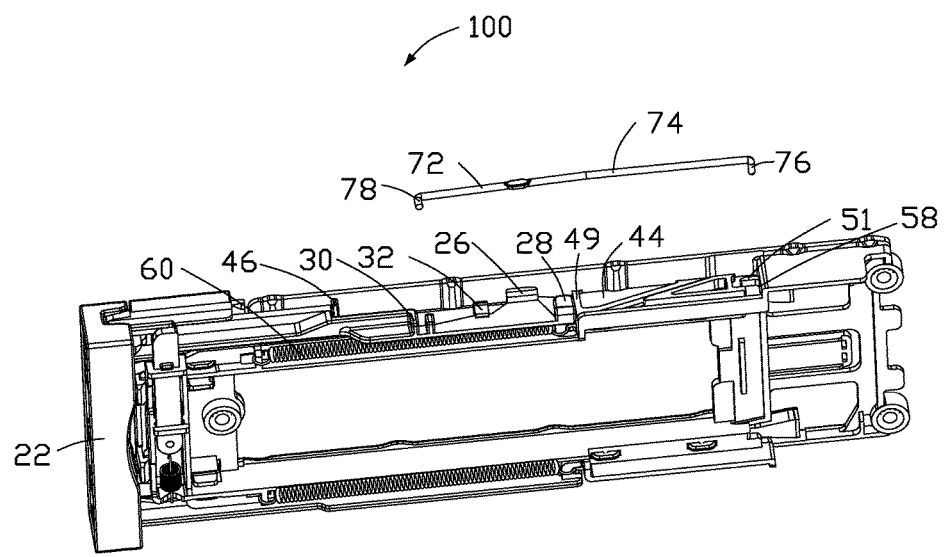
FIG. 3 is a partially exploded view of the push-push apparatus of FIG. 1.
Figure 4:
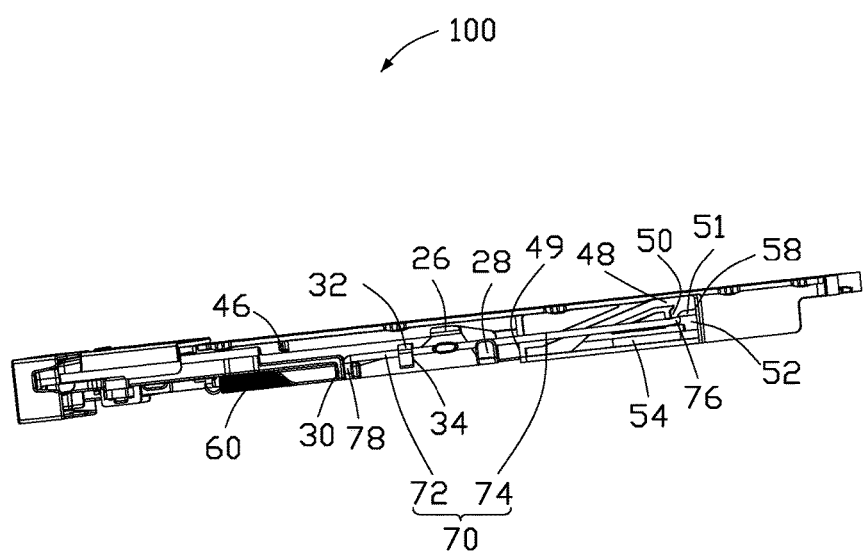
FIG. 4 is similar to FIG. 1, but with the elastic rod sliding to an end of a second sliding slot.
Figure 5:
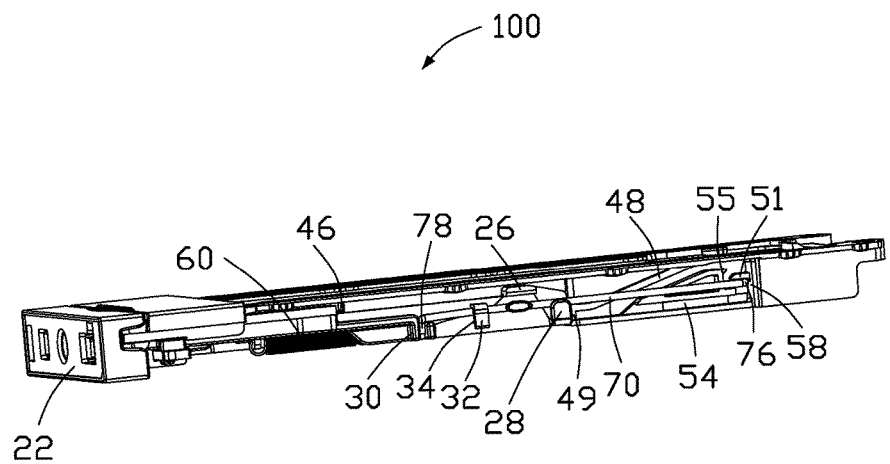
FIG. 5 is similar to FIG. 1, but with the elastic rod sliding to an end of a third sliding slot.
Figure 6:
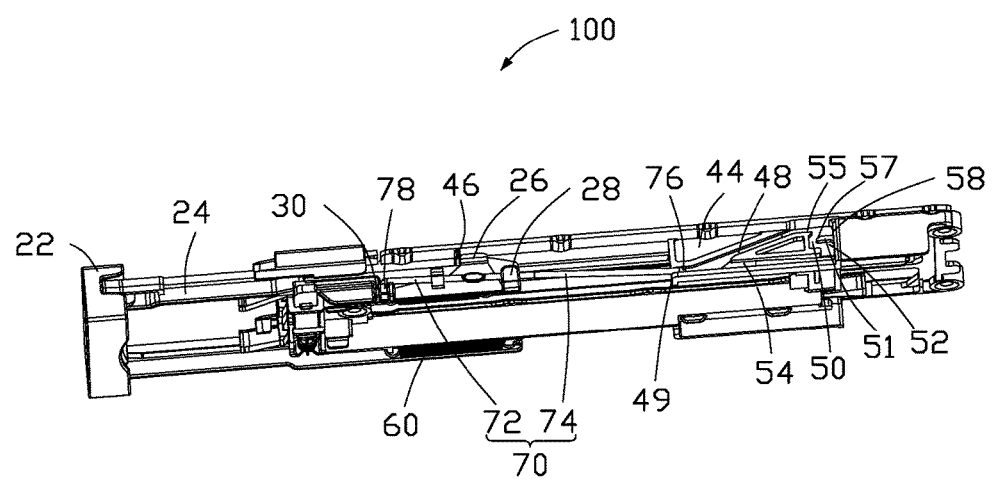
FIG. 6 is similar to FIG. 1, but with the elastic rod sliding to an end of a fourth sliding slot.

FIG. 1 to FIG. 6 illustrate a push-push apparatus 100. The push-push apparatus 100 includes a pressing member 20, a bracket 40, two elastic members 60, and an elastic rod 70. The bracket 40 includes a carrying plate 42 for carrying a hard disk and two opposing lateral plates 44 vertically connected to the carrying plate 42. A blocking portion 46 and a resisting portion 49 vertically protrude from one of the lateral plates 44. The pressing member 20 includes a pressing portion 22 and two sliding plates 24 perpendicularly extending from two ends of the pressing portion 22. The sliding plate 24 includes a stopping portion 26 and a pushing portion 28. The two sliding plates 24 are slidably disposed on outer sides of the two lateral plates 44 so that the pressing member 20 can be pressed to slide along the side plates 44.

The two ends of the elastic member 60 are fixed to the sliding plate 24 and the bracket 40. One of the lateral plates 44 defines a first sliding slot 48, a second sliding slot 50, a third sliding slot 52, and a fourth sliding slot 54. The first to fourth sliding slots 48 to 54 communicate with each other end to end. A locking member 56 is disposed at an ending point of the second sliding slot 50. The elastic rod 70 includes a restricting section 72 and a positioning section 74. The restricting section 72 is fixed to the sliding plate 24. The positioning section 74 includes a sliding portion 76. The sliding portion 76 can slide along the first to fourth sliding slots 48 to 54 in sequence.

When the pressing member 20 is pressed, the sliding portion 76 slides from a starting point of the first sliding slot 48 to an ending point of the first sliding slot 48. The elastic member 60 and the positioning segment 74 are thereby elastically deformed. When the sliding portion 76 slides toward the first sliding slot 48 to the ending point of the first sliding slot 48, the pushing portion 28 abuts against the blocking portion 49 and pushes the bracket 40 to move in a first direction so that the bracket 40 is pushed into a computer or other device which needs a hard disk. The elastic force of the elastic member 60 and the positioning section 74 drive the sliding portion 76 to slide from the ending point of the first sliding slot 48 to an ending point of the second sliding slot 50. The portion 76 is locked here by the locking member 56 so that the pressing member 20 keeps in a first position. When the pressing member 20 is pressed again, the sliding portion 76 slides along the third sliding slot 52. The elastic force of the elastic member 60 and the positioning section 74 further drive the sliding portion 76 to slide along the fourth sliding slot 54 from the ending point of the third sliding slot 52 to a starting point of the first sliding slot 48. When the sliding portion 76 is positioned at the starting point of the first sliding slot 48, the stopping portion 26 abuts against the blocking portion 46. When the stopping portion 26 abuts against the blocking portion 46 and the pressing member 20 is pulled out, the stopping portion 26 drives the bracket 40 to move in a second direction opposite to the first direction so that the hard disk can be removed from or inserted into the computer.

A distance between the ending point of the first sliding slot 48 and the pressing portion 22 is greater than a distance between the ending point of the second sliding slot 50 and the pressing portion 22. A distance between the ending point of the second sliding slot 50 and the pressing portion 22 is greater than a distance between the ending point of the fourth sliding slot 54 and the pressing portion 22. Such distance is less than a distance between the ending point of the third sliding slot 52 and the pressing portion 22. An abutting surface 58 is formed at the ending point of the first sliding slot 48 and the ending point of the third sliding slot 52. A guiding portion 51 protrudes from the abutting surface 58 and faces the pressing member 20. The guiding portion 51 includes a guiding end 57 adjacent to the pressing member 20. A curved surface is formed on the guiding end 57. The sliding portion 76 slides along the guiding portion 51 in the second sliding slot 50. A depth of the first sliding slot 48 is greater than a depth of the fourth sliding slot 54. A depth of the fourth sliding slot 54 is greater than a depth of the third sliding slot 52.

A restricting portion 55 protrudes from the lateral plate 44. The restricting portion 55 distances the guiding portion 51 and is disposed at a side of the guiding portion adjacent to the first sliding slot 48. A distance between an end of the restricting portion 55 away from the pressing member 20 and the pressing member 20 is less than a distance between the guiding end 57 and the pressing member 20. The sliding portion 76 is cylindrical and bent from an end of the positioning section 74 adjacent to the restricting portion 55. A distance L1 between the guiding end 57 and the restricting portion 55 in a direction perpendicular to the pressing member 20 is smaller than a diameter D1 of the sliding portion 76. The locking member 56 includes a first abutting portion 81 connected with the restricting portion 55 and a second abutting portion 83 extending from an end of the abutting portion 81 away from the restriction portion 55 toward the abutting surface 58. The sliding portion 76 is locked at a junction between the first abutting portion 81 and the second abutting portion 83.

An end of the restricting section 72 away from the positioning section 74 is bent to form a hook 78. The sliding plate 24 includes two clapping portions 30 with a distance between them. The hook 78 is sandwiched between the two clapping portions 30. The elastic rod 70 is made of strong iron wire. The sliding plate 24 further includes a protrusion 32. The protrusion 32 defines an accommodating groove 34 having an opening facing away from the carrying plate 42. The restriction section 72 is disposed in the accommodating slot 34 and abuts the protrusion 32. The ending point of the first sliding slot 48, the ending point of the second sliding slot 50, and the ending point of the third sliding slot 52 are located between an extended line of the restriction section 72 and the carrying plate 42.

The embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A push-push apparatus comprising:
   a bracket comprising a carrying plate and two opposite lateral plates connected to the carrying plate, one of the lateral plate defining a first sliding slot, a second sliding slot, a third sliding slot and a fourth sliding slot communicating with each other end to end, one of the lateral plate comprising a blocking portion and a resisting portion;
   a pressing member comprising a pressing portion and two sliding plates extending from two ends of the pressing portion and slidably disposed on the two lateral plates, one of the sliding plate comprising a stopping portion and a pushing portion;
   a locking member disposed at an ending point of the second sliding slot;
   an elastic member fixed to the sliding plate and the bracket;
   an elastic rod fixed to one of the sliding plate and comprising a sliding portion;
   wherein the pressing member is pressed to drive the sliding portion to slide along the first sliding slot and deform the elastic member and the elastic rod, when the sliding portion slides along the first sliding slot to an ending point the first sliding slot intersected to the second sliding slot, the pushing portion abuts against the blocking portion and pushes the bracket to move at a first direction; the sliding portion is slidable to the second sliding slot under force of the deformed elastic member and the deformed elastic rod and is locked by the locking member; the pressing member is pressed again to drive the sliding portion to slide along the third sliding slot, the sliding portion is further slidable along the third sliding slot, the fourth sliding slot and the first sliding slot in sequence under force of the deformed elastic member and the deformed elastic rod; when the sliding portion is positioned at a starting point of the first sliding slot away from the fourth sliding slot, the stopping portion abuts against the blocking portion and pushes the bracket to move at a second direction opposite to the first direction.

2. The push-push apparatus as claimed in claim 1, wherein the elastic rod comprises a restricting section and a positioning section, the restricting section is elastic and fixed to the sliding plate, the sliding portion is fixed a free end of the positioning section.

3. The push-push apparatus as claimed in claim 2, wherein the locking member comprises a first abutting portion connected with the restricting portion and a second abutting portion extending from an end of the abutting portion away from the restriction portion toward the abutting surface, the sliding portion is locked at a junction between the first abutting portion and the second abutting portion.

4. The push-push apparatus as claimed in claim 3, wherein an end of the restricting section away from the positioning section is bent to form a hook, the sliding plate comprises two spaced clapping portions, the hook is sandwiched between the two clapping portions, the sliding plate further comprises a protrusion, the protrusion defines an accommodating groove having an opening facing away from the carrying plate, the restriction section is disposed in the accommodating slot and abuts the protrusion.

5. The push-push apparatus as claimed in claim 1, wherein a depth of the first sliding slot is greater than a depth of the fourth sliding slot, a depth of the fourth sliding slot is greater than a depth of the third sliding slot.

6. The push-push apparatus as claimed in claim 1, wherein a distance between an ending point of the first sliding slot intersected to the second sliding slot and the pressing portion is greater than a distance between an ending point of the second sliding slot intersected to the third sliding slot and the pressing portion, a distance between the ending point of the second sliding slot and the pressing portion is greater than a distance between an ending point of the fourth sliding slot intersected to the first sliding slot and the pressing portion and less than a distance between an ending point of the third sliding slot intersected to the fourth sliding slot and the pressing portion.

7. The push-push apparatus as claimed in claim 1, wherein an abutting surface is formed at the ending point of the first sliding slot and the ending point of the third sliding slot, a guiding portion protrudes from the abutting surface and faces the pressing member, the guiding portion comprises a guiding end adjacent to the pressing member, a curved surface is formed on the guiding end, the sliding portion slides along the guiding portion in the second sliding slot.

8. The push-push apparatus as claimed in claim 7, wherein a restricting portion protrudes from the lateral plate, the restricting portion spaces apart the guiding portion and is disposed a side of the guiding portion adjacent to the first sliding slot, a distance between an end of the restricting portion away from the pressing member and the pressing member is less than a distance between the guiding end and the pressing member, the sliding portion is bent from an end of the positioning section adjacent to the restricting portion and is a cylindrical shape, a distance between the guiding end and the restricting portion in a direction perpendicular to the pressing member is smaller than a diameter of the sliding portion.

9. The push-push apparatus as claimed in claim 8, wherein the locking member comprises a first abutting portion connected with the restricting portion and a second abutting portion extending from an end of the abutting portion away from the restriction portion toward the abutting surface, the sliding portion is locked at a junction between the first abutting portion and the second abutting portion.

10. The push-push apparatus as claimed in claim 1, wherein the elastic rod is made of tough iron wire.

11. A push-push apparatus comprising:
   a bracket comprising a carrying plate and two lateral plates fixed to two opposite sides of the carrying plate, one of the lateral plate defining a first sliding slot, a second sliding slot, a third sliding slot and a fourth sliding slot communicating with each other end to end, one of the lateral plate comprising a blocking portion and a resisting portion;
   a pressing member comprising a pressing portion and two sliding plates extending from two ends of the pressing portion and slidably fixed to the two lateral plates, one of the sliding plate comprising a stopping portion and a pushing portion;
   a locking member disposed at an ending point of the second sliding slot;
   an elastic member fixed to the sliding plate and the bracket;
   an elastic rod fixed to one of the sliding plate and comprising a sliding portion;
   wherein the pressing member is pressed to drive the sliding portion to slide along the first sliding slot and deform the elastic member and the elastic rod, when the sliding portion slides along the first sliding slot to an ending point the first sliding slot intersected to the second sliding slot, the pushing portion abuts against the blocking portion to drive the bracket to move at a first direction; the deformed elastic member and the deformed elastic rod drive the sliding portion to slide along the second sliding slot until the sliding portion is locked by the locking member; the pressing member is pressed again to drive the sliding portion to slide along the third sliding slot, the sliding portion is further slidable along the third sliding slot, the fourth sliding slot and the first sliding slot in sequence under force of the deformed elastic member and the deformed elastic rod; when the sliding portion is positioned at a starting point of the first sliding slot away from the fourth sliding slot, the stopping portion abuts against the blocking portion to drive the bracket to move at a second direction opposite to the first direction.

12. The push-push apparatus as claimed in claim 11, wherein the elastic rod comprises a restricting section and a positioning section, the restricting section is elastic and fixed to the sliding plate, the sliding portion is fixed a free end of the positioning section.

13. The push-push apparatus as claimed in claim 12, wherein the locking member comprises a first abutting portion connected with the restricting portion and a second abutting portion extending from an end of the abutting portion away from the restriction portion toward the abutting surface, the sliding portion is locked at a junction between the first abutting portion and the second abutting portion.

14. The push-push apparatus as claimed in claim 13, wherein an end of the restricting section away from the positioning section is bent to form a hook, the sliding plate comprises two spaced clapping portions, the hook is sandwiched between the two clapping portions, the sliding plate further comprises a protrusion, the protrusion defines an accommodating groove having an opening facing away from the carrying plate, the restriction section is disposed in the accommodating slot and abuts the protrusion.

15. The push-push apparatus as claimed in claim 11, wherein a depth of the first sliding slot is greater than a depth of the fourth sliding slot, a depth of the fourth sliding slot is greater than a depth of the third sliding slot.

16. The push-push apparatus as claimed in claim 11, wherein a distance between an ending point of the first sliding slot intersected to the second sliding slot and the pressing portion is greater than a distance between an ending point of the second sliding slot intersected to the third sliding slot and the pressing portion, a distance between the ending point of the second sliding slot and the pressing portion is greater than a distance between an ending point of the fourth sliding slot intersected to the first sliding slot and the pressing portion and less than a distance between an ending point of the third sliding slot intersected to the fourth sliding slot and the pressing portion.

17. The push-push apparatus as claimed in claim 11, wherein an abutting surface is formed at the ending point of the first sliding slot and the ending point of the third sliding slot, a guiding portion protrudes from the abutting surface and faces the pressing member, the guiding portion comprises a guiding end adjacent to the pressing member, a curved surface is formed on the guiding end, the sliding portion slides along the guiding portion in the second sliding slot.

18. The push-push apparatus as claimed in claim 17, wherein a restricting portion protrudes from the lateral plate, the restricting portion spaces apart the guiding portion and is disposed a side of the guiding portion adjacent to the first sliding slot, a distance between an end of the restricting portion away from the pressing member and the pressing member is less than a distance between the guiding end and the pressing member, the sliding portion is bent from an end of the positioning section adjacent to the restricting portion and is a cylindrical shape, a distance between the guiding end and the restricting portion in a direction perpendicular to the pressing member is smaller than a diameter of the sliding portion.

19. The push-push apparatus as claimed in claim 18, wherein the locking member comprises a first abutting portion connected with the restricting portion and a second abutting portion extending from an end of the abutting portion away from the restriction portion toward the abutting surface, the sliding portion is locked at a junction between the first abutting portion and the second abutting portion.

20. The push-push apparatus as claimed in claim 11, wherein the elastic rod is made of tough iron wire.

* * * * *